March 5, 1968
D. B. AULD ET AL
3,372,280
SAFETY HANDLE AND PROBE FOR PORTABLE SURFACE
GAUGE USING RADIOACTIVE SOURCE
Original Filed June 25, 1963
2 Sheets-Sheet 1
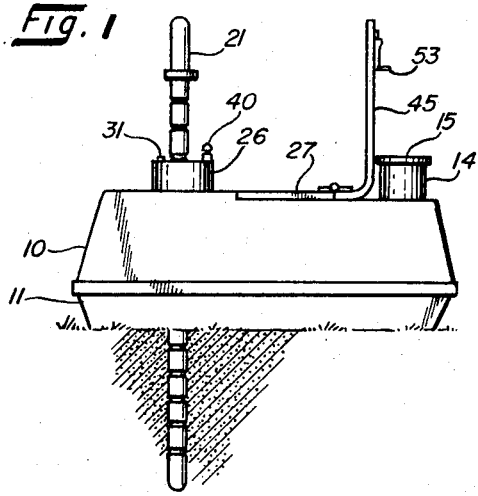
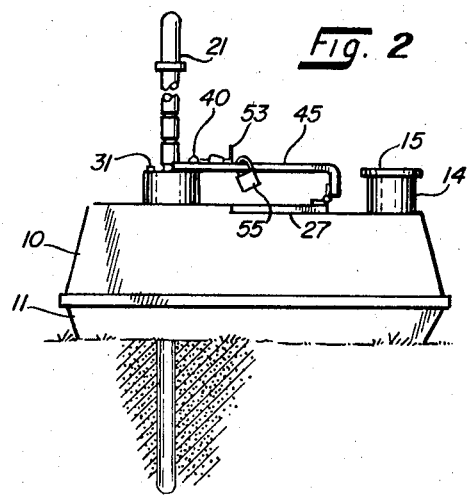
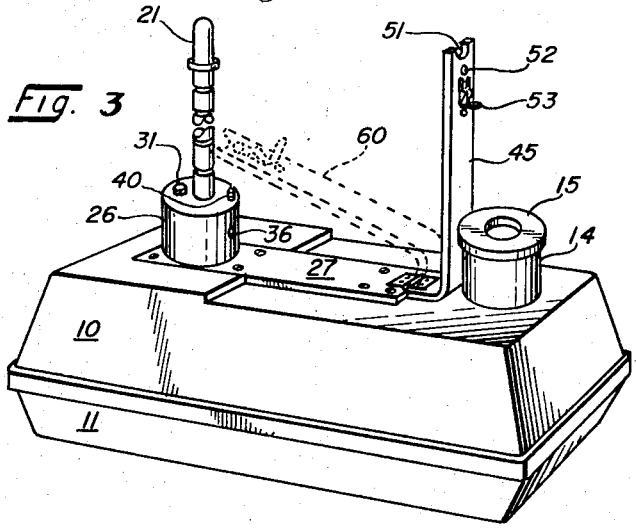
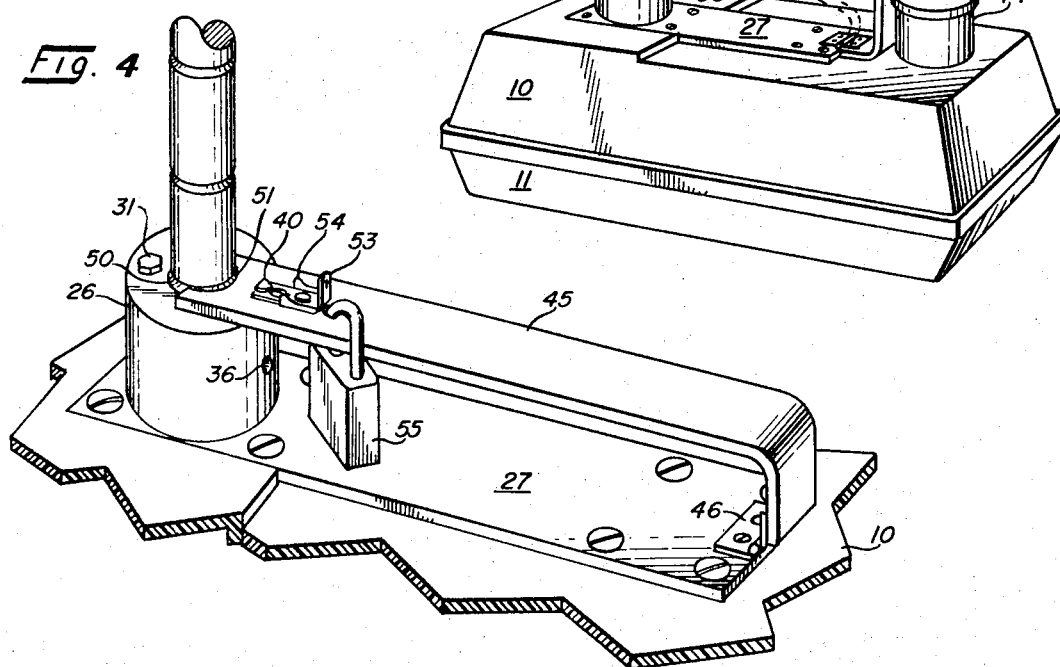
INVENTORS
David B. Auld
Andrew Lowery
Robert F. Penny
*B. B. Olive*
Attorney

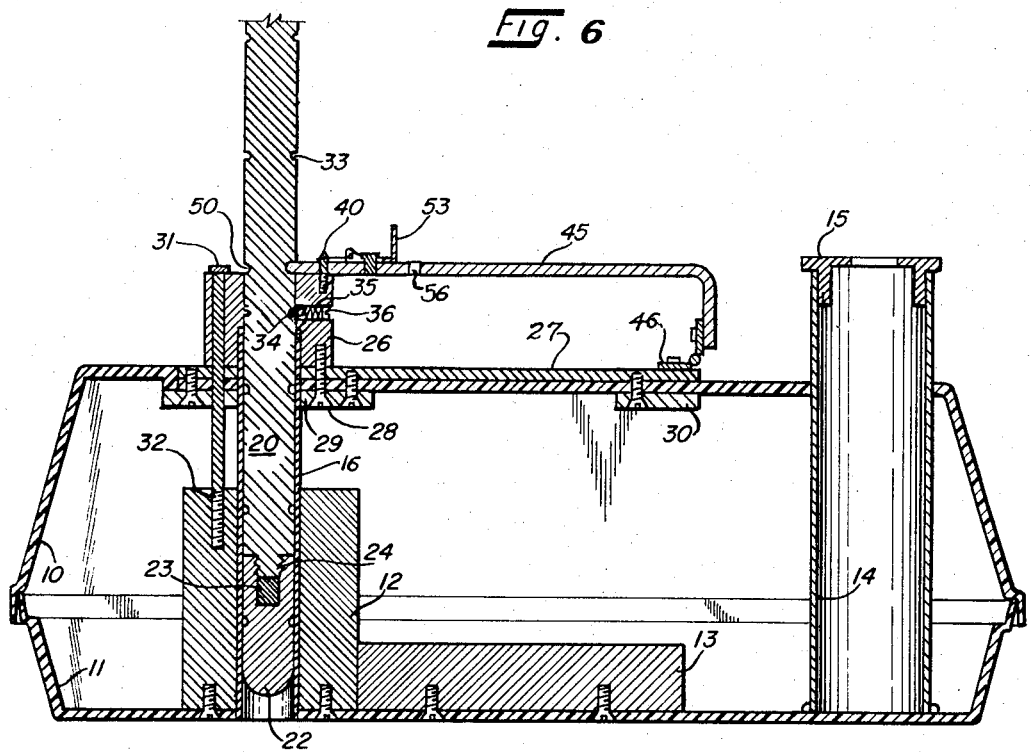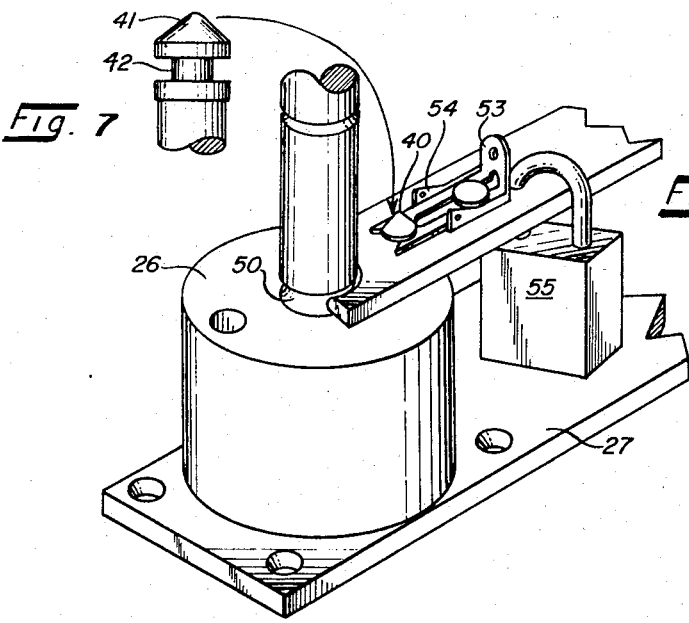

United States Patent Office 3,372,280
Patented Mar. 5, 1968

3,372,280
SAFETY HANDLE AND PROBE FOR PORT-
ABLE SURFACE GAUGE USING RADIO-
ACTIVE SOURCE
David B. Auld, 3123 Childers St., Andrew Lowery, 4901
Grinnell Drive, and Robert F. Penny, Rte. 1, Justice
Drive, all of Raleigh, N.C. 27609
Continuation of application Ser. No. 290,539, June 25,
1963. This application Jan. 20, 1966, Ser. No. 560,396
3 Claims. (Cl. 250—106)

ABSTRACT OF THE DISCLOSURE

A portable radioactive surface gauge employs a probe rod which mounts a radioactive source and which is constructed so that it will interlock with the handle of the gauge only when the probe rod source is in a shielded above-surface position. The probe can otherwise be releasably secured for measuring in various sub-surface, direct transmission, positions. The handle remains useful as a handle when the probe rod, which is removably mounted in the gauge, is completely removed.

This application is a continuation of application Ser. No. 290,539, filed June 25, 1963, entitled, "Safety Handle for Portable Surface Gauge Using Radioactive Source," and now abandoned.

Radioactive source material is employed in many new gauge devices which use the radioactive material as a means for measuring density, moisture, material composition and the like. Particularly where the gauge is made as a portable unit and safety practices are loose it becomes increasingly important to design the gauge in a form which encourages safe use of the radioactive source and makes difficult or impossible an unsafe use of the source. For example, where a radioactive source is above ground and is unshielded considerable physical harm may result if the human body has a close and prolonged exposure to the source. The source can of course be shielded but cannot be shut off as such.

Commercially available radioactive gauges now include a portable type of surface density gauge which is placed on the surface of the material being measured and through use of a gamma source detects direct and reflected gamma rays as a measure of its density. Certain of the commercial forms of surface density gauges employ a gamma source which remains fixed and properly shielded in the housing of the gauge. Other density gauges and particularly of the type made by the assignee of this invention place the source in the end of a probe and when in use the probe is lowered from a safe shielded position within the gauge housing to a measuring position located at some predetermined level in the material and below its surface. With the probe source extended out of its safe position, it is important in practice that it be brought back to its safe shielded position before the gauge is moved otherwise the operator is apt to receive a harmful exposure. Even though a gauge of this kind is heavy because of the lead shielding, the handle is ordinarily not affected by the position of the probe and it is easy enough for the operator to carelessly lift the gauge while the probe is extended out of its shielding and thus harm himself. Atomic Energy Commission license requirements while stringent have not eliminated the problem. When the source is stored and is physically absent from the gauge proper there is of course no exposure problem. However, even in this condition the handle structure should act to support the heavy shielding material because the housing itself is usually made of a thin sheet material not adapted to carry the heavy weight of the shielding material.

A principal object of the present invention is to provide a handle for a radioactive probe, portable, surface type gauge which handle is generally not useful as a handle unless the probe is in a safe shielded position.

Another object is to provide a handle for a radioactive probe, portable, surface type gauge which handle can only be locked into handle position when the probe is in a safe shielded position and when locked insures that the probe will remain in a safe position.

Another object is to provide a handle structure for a radioactive probe, portable, surface type gauge having a housing enclosing a substantial mass of heavy shielding material which structure can be locked into and unlocked from a handle forming position and in such position is arranged to be integrally connected to the shielding material.

Another object is to provide a handle for a radioactive probe, portable, surface type gauge which handle can be locked into a handle forming position irrespective of the presence of the probe and in such position can be secured to the probe shielding material located in the gauge housing.

Another object is to provide an integral safety handle structure which can be easily assembled with a radioactive probe, portable, surface type gauge.

These and other objects of the invention will appear from the description and drawings in which like numerals refer to like elements and referring to a preferred embodiment of the invention.

FIGURE 1 is a side elevation of a radioactive probe, portable, surface type density gauge having a handle structure embodying the invention and illustrating the probe extended into a ground bore hole to a measuring position.

FIGURE 2 is a side elevation similar to FIGURE 1 illustrating the probe source lifted out of the bore hole and positioned in a safe position and the handle structure in handle forming position.

FIGURE 3 is a side perspective illustrating the handle structure in non-handle forming position and in dotted lines an intermediate position.

FIGURE 4 is a fragmentary perspective of the handle structure in a locked handle forming position.

FIGURE 5 is an enlarged fragmentary perspective of portions of the handle structure shown in FIGURE 4, the view being taken from the same side as FIGURE 4 but from an opposite direction.

FIGURE 6 is an elevation cross section taken longitudinally of the gauge and illustrating the probe source in a safe shielded position and the handle structure in handle forming position.

FIGURE 7 is an enlarged fragmentary perspective of a pin employed with the handle structure.

Referring now to the drawings, a radioactive probe, portable, surface type gauge of the type being described is frequently used as a soil density measuring gauge. The type SC109 and type SC120 surface density gauges presently manufactured by the assignee of the present invention are of the type illustrated in the drawings. The illustrated gauge includes a housing having an upper section 10 suitably secured to a lower section 11, both sections being preferably formed as lightweight, thin wall, molded plastic sections. Shielding for the probe source when in its safe, shielded position is provided by a hollow, open ended, thick walled lead cylinder 12 that is suitably secured to the bottom wall by screws, glue or other means. Additional protection against direct and reflected gamma rays produced by the probe source particularly when in extended position as in FIGURE 1, is provided by a substantially rectangular shaped lead block 13 that is also secured to the bottom of the housing.

When the probe is extended into measuring position as illustrated for example in FIGURE 1, measurement of the gamma count is made by an appropriate photomultiplier or Geiger-Mueller counter tube, not shown. The counter is placed in the tubular receptacle 14 which mounts on the floor of the housing and has an annular cap 15 through which electrical leads, not shown, from the counting device may be passed. Since the invention is primarily concerned with the probe and handle structures and not with the counting circuitry such circuitry is not treated in further detail.

Cylinder 12 mounts a guide tube 16. The probe 20 mounted in tube 16 generally takes the form of a vertically positioned and adjustable circular rod having a suitable handle 21 at one end with the source holder 22 and gamma source 23 being located at the opposite end. Mating male and female threads as indicated at 24 are provided between the source holder 22 and the main body of probe 20 in order that source 23 may be removed and replaced as desired and which facilitates storage of probe 20 in an unshielded state.

Gauges using radioactive materials for measuring density, moisture and material composition are designed around the specific radioactive material which is to be used. Cesium 137 may, for example, be used as source 23. It is known in the art that gamma radiation is easily contained by high density shielding material, such as lead and the like, which easily absorb the radiation produced thereby; and also, that the gamma radiation is easily dissipated over a relatively small distance, the formula being the inverse square ratio. Element 20 as used is stainless steel and although this does not trap the radiation immediately surrounding the source, over the length of the rod it does trap a quantity sufficient to render the raidation harmless to the user when standing above the device. Element 22 may be made from any high density material such as lead and the gamma radiation traveling axially and downwardly is dissipated in the material to a level which renders the same harmless. When the probe has entered the soil, the material immediately surrounding the source is thus not of a quantity to block all of the radiation emitted thereby. The radiation counter which is inserted in receptacle 14 is thereby adapted to accurately count the radiation emitted from the source.

Probe 20 is guided for vertical movement by a relatively large collar 26 which surrounds the probe and is fixedly mounted on the top housing wall on a handle base plate 27 by means of suitable screws such as indicated at 28. Base plate 27 is in turn secured by screws, bolts or other means to a pair of back up plates 29, 30, disposed within the upper housing section 10 opposite, respectively the front and rear ends of base plate 27. A bolt 31 passes through collar 26, through base plate 27, through the upper housing section 10, through the front back up plate 29 and is threaded into the lead cylinder 12 as indicated at 32. Thus, when base plate 27 is lifted the load of lead cylinder 12 as well as that of lead block 13 is transmitted to the base plate 27. The housing itself is thereby relieved of such load.

Adjustment of the source level is accomplished by a detent arrangement which includes a series of relatively shallow grooves 33 of uniform character spaced at regular intervals along the length of probe 20. The grooves 33 are adapted to receive a detent ball 34 that is continually urged inwards by reason of a spring 35 that is held in place by means of a set screw 36. The ball 34, the spring 35 and the set screw 36 are all mounted in a radially positioned hole provided in the wall of collar 26 and as the probe is manually adjusted up and down the detent ball 34 will automatically engage one of the grooves 33 and will hold probe 20 in the position corresponding to the groove engaged.

Mounted on top of collar 26 as an integral part thereof is a pin 40. Pin 40 has a threaded end which is screwed into a mating threaded hole in collar 26, a conical shaped head 41 and a slotted groove 42, an enlargement of the top, slotted groove, portion of pin 40 being shown in FIGURE 7. The handle proper is formed by the L-shaped handle member 45 which is pivotedly secured to the base plate 27 by means of the hinge 46. As later explained handle 45 must engage and fixedly position probe 20 whenever handle 45 is serving as a handle. Therefore, whenever probe 20 is being positioned, handle 45 has to be swung out of the way and would generally be moved to the vertical position shown in FIGURE 1 and FIGURE 3. In this last mentioned position, it is important to note that due particularly to the weight of the lead cylinder 12 and the lead block 13, the handle 45 is practically useless as a handle. With the handle in such position, the operator is at the very least given a sharp reminder that the handle is not properly positioned for lifting of the gauge and particularly the probe.

In contrast, when it is desired to manually move the gauge to a new location the probe 20 is positioned to the shielded position as represented in FIGURE 2 and FIGURE 6. At this position a specially shaped and relatively large groove 50 provided on probe 20 mates with a matching curved portion 51 provided in the end of handle 45 and the pin 40 is arranged to pass through a hole 52 provided in handle 45. Positioning is facilitated by first slightly engaging the probe groove 50 and the handle portion 51 with the handle tilted as indicated by the dotted line position 60 and then lowering the probe and handle together until fully engaged. Once handle portion 51 is solidly engaged with groove 50, a clip member 53 may be pushed between a pair of guides 54 so as to engage the slotted groove 42 of pin 40 and lock handle 45 to collar 26. A suitable pin locking means of this kind is marketed under the name "Snapslide Fasteners" and is sold by the Dimco-Gray Company, 207 E. 6th St., Dayton, Ohio. To insure that handle 45 will not thereafter leave this fixed position and to meet government safety requirements, a padlock 55 is provided which passes through a hole 56 located immediately behind clip member 53.

Of special interest is the fact that groove 50 is made of a different character than any of the detent recesses or grooves 33. Therefore, the free end of handle 45 will only interlock with groove 50 and only when the probe source 23 is confined in the shielding cylinder 12. Furthermore, handle 45 can only assume handle forming position when source 23 is safely shielded and the fastening means 53 is operative only when source 23 is in a shielded position. As a further characteristic, the handle 45 is usable as a means to comfortably carry the heavy weight of cylinder 12 and block 13 only when source 23 is properly shielded.

While the invention is primarily concerned with a handle structure that is employed with a radioactive probe, mention is made of the fact that the handle 45 can be locked into handle forming position with the probe 20 completely absent. That is, when probe 20 is physically absent, handle 45 need only engage and be connected to pin 40 in order to form a handle.

Having described the invention, we claim:

1. A cooperative safety handle and probe for a portable, radioactive, surface type gauge adapted to take sub-surface measurements by direct transmission including in combination: a vertically disposed elongated probe; a radioactive source secured to the bottom of said probe; a housing removably mounting said probe and including top and bottom walls arranged perpendicular to the axis of said probe and having openings therethrough for passage of said probe; a radioactive shielding block secured within said housing to said bottom wall and having an opening therethrough aligned with both said wall openings and arranged for passage of said probe; positioning means mounted on said housing and engaging said probe and enabling said probe to be releasably secured in various vertical positions whereby said source may be positioned in corresponding sub-surface direct transmission measuring positions; a bar member having one end pivotally secured to said top wall at a position removed from said top wall opening and its other end free to swing into and out of engagement with said probe at a position above said top wall opening, the free end of said bar member and the surface of said probe having mating surface formations capable of being arranged to interlock, the surface formation of said probe being located so that said bar member free end surface formation interlocks therewith only when said source is positioned within said block, said bar member being positionable horizontally and effective as a handle, whenever said probe is mounted in said housing, only when said formations are in interlock; and locking means effective when said probe is mounted in said housing to simultaneously hold said bar member and probe formations in said interlock, said source in a shielded position and said bar member secured to said housing and in a handle forming position, said locking means furthermore being effective when said probe is dismounted from said housing to hold said bar member secured to said housing in the same said handle forming position.

2. A cooperative safety handle and probe as claimed in claim 1 wherein said positioning means includes guide means secured to said top wall and adapted to sli receive and guide said probe, a plurality of vert spaced detent recesses on said probe and cooperatir tent means in said guide means, said guide means, re and detent means enabling the said releasable sec and positioning of said probe in said corresponding surface positions.

3. A cooperative safety handle and probe as cla in claim 2 wherein said detent recesses are of un character and said probe surface formation is of difl character such that when said probe is mounted ir housing said free end of said bar member can be locked only with said probe surface formation an with any of said recesses thereby allowing said sou be positioned in use at said sub-surface direct transm measuring positions corresponding to said recesses preventing said bar member being employed as a h except when said source is in said block.

References Cited
UNITED STATES PATENTS

| | | | |
|---|---|---|---|
| 2,226,346 | 12/1940 | Mussman | 292—2 |
| 2,675,487 | 4/1954 | Schallert et al. | 250—1 |
| 2,998,527 | 8/1961 | Shevick et al. | 250- |
| 3,126,484 | 3/1964 | Meeder et al. | 250- |

ARCHIE R. BORCHELT, *Primary Examiner.*